US012719678B2

(12) United States Patent
Zimerman et al.

(10) Patent No.: US 12,719,678 B2
(45) Date of Patent: Aug. 25, 2026

(54) TRAINING NEURAL NETWORKS WITH NON-POLYNOMIAL ELEMENTS FOR HOMOMORPHIC ENCRYPTION COMPUTATIONS USING SUB-NETWORKS AND MULTI-LOSS

(71) Applicant: International Business Machines Corporation, Armonk, NY (US)

(72) Inventors: Itamar Zimerman, Tel-Aviv (IL); Nir Drucker, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 18/182,746

(22) Filed: Mar. 13, 2023

(65) Prior Publication Data

US 2024/0313966 A1 Sep. 19, 2024

(51) Int. Cl.
*H04L 9/30* (2006.01)
*G06N 3/08* (2023.01)

(52) U.S. Cl.
CPC ............. *H04L 9/3093* (2013.01); *G06N 3/08* (2013.01)

(58) Field of Classification Search
CPC ......... H04L 9/3093; H04L 9/008; G06N 3/08; G06N 3/045
See application file for complete search history.

(56) References Cited

U.S. PATENT DOCUMENTS

| | | | | |
|---|---|---|---|---|
| 9,946,970 | B2 * | 4/2018 | Gilad-Bachrach ... | G06N 3/0499 |
| 12,170,718 | B2 * | 12/2024 | Micciancio ............. | H04L 9/008 |
| 2022/0337390 | A1 * | 10/2022 | Cheon .................. | H04L 9/3026 |
| 2023/0153686 | A1 * | 5/2023 | Waller .................... | H04L 9/008 706/12 |
| 2024/0121076 | A1 * | 4/2024 | Lee ......................... | H04L 9/008 |
| 2024/0297778 | A1 * | 9/2024 | Kim ........................ | H04L 9/008 |
| 2024/0303471 | A1 * | 9/2024 | Kellerman ............. | G06N 3/048 |

FOREIGN PATENT DOCUMENTS

| | | | |
|---|---|---|---|
| CN | 113591942 | A | 11/2021 |
| KR | 102304992 | B1 | 9/2021 |
| WO | 2021214327 | A1 | 10/2021 |

OTHER PUBLICATIONS

Ali et al. On Polynomial Approximations for Privacy-Preserving and Verifiable ReLU Networks. 2020. NeurIPS PPML Workshop. pp. 1-14. (Year: 2020).*

Brand et al. Practical Privacy-Preserving Machine Learning using Fully Homomorphic Encryption, (2023), Proceedings on Privacy Enhancing Technologies, pp. 1-15.*

(Continued)

*Primary Examiner* — Lynn D Feild
*Assistant Examiner* — Abdullah Almamun
(74) *Attorney, Agent, or Firm* — Stephen R. Yoder

(57) ABSTRACT

An example system includes a processor to receive a non-homomorphic encryption (HE)-friendly analytics model including a non-polynomial element. The processor is to train a substitution model in which the non-polynomial element of the non-homomorphic encryption (HE)-friendly analytics model is replaced with a sub-network including a polynomial replacement element.

19 Claims, 8 Drawing Sheets

(56) References Cited

OTHER PUBLICATIONS

Zhang et al. Secure Train: An Approximation-Free and Computationally Efficient Framework for Privacy-Preserved Neural Network Training, (2022), IEEE, pp. 187-202.*
Ehsan Hesamifard et al., "CryptoDL: Deep Neural Networks over Encrypted Data", arXiv, Nov. 14, 2017, 21 pages.
Junghyun Lee et al., "Precise Approximation of Convolutional Neural Networks for Homomorphically Encrypted Data", ArXiv, Jun. 14, 2021, 24 pages.
Moran Baruch et al., "A methodology for training homomorphic encryption friendly neural networks", Published in arXiv, Jul. 7, 2022, 19 pages.
Philip Derbeko et al., "PolyDNN: Polynomial Representation of NN for Communication-less SMPC Inference", Apr. 2, 2021, ResearchGate, 15 pages.
Baruch et al., "Fighting COVID-19 in the Dark: Methodology for Improved Inference Using Homomorphically Encrypted DNN", https://www.researchgate.net/publication/356001836_Fighting_COVID-19_in_the_Dark_Methodology_for_Improved_Inference_Using_Homomorphi cally_Encrypted_DNN, Nov. 2021, 11 pages.
Benaissa et al., "Tenseal: A Library for Encrypted Tensor Operations Using Homomorphic Encryption", arXiv:2104.03152v2 [cs.CR], Apr. 28, 2021, 12 pages.
Boemer et al., "nGraph-HE2: A High-Throughput Framework for Neural Network Inference on Encrypted Data", https://dl.acm.org/doi/10.1145/3338469.3358944, Nov. 11, 2019, pp. 45-56.
Chen et al., "THE-X: Privacy-Preserving Transformer Inference with Homomorphic Encryption", https://aclanthology.org/2022.findings-acl.277.pdf, May 2022, pp. 3510-3520.
Dathathri et al., "CHET: an optimizing compiler for fully-homomorphic neural-network inferencing", https://dl.acm.org/doi/10.1145/3314221.3314628, Jun. 8, 2019, pp. 142-156.
Dathathri et al., "EVA: an encrypted vector arithmetic language and compiler for efficient homomorphic computation", https://dl.acm.org/doi/10.1145/3385412.3386023, Jun. 11, 2020, pp. 546-561.
Egidi et al., "A New Remez-Type Algorithm for Best Polynomial Approximation", https://link.springer.com/chapter/10.1007/978-3-030-39081-5_7, Feb. 14, 2020, pp. 56-69.
Pachon et al., "Barycentric-Remez algorithms for best polynomial approximation in the chebfun system", https://www.chebfun.org/publications/remez.pdf, Oct. 10, 2009, pp. 721-741.

* cited by examiner

300A

300B

600A

600B

600C

TRAINING NEURAL NETWORKS WITH NON-POLYNOMIAL ELEMENTS FOR HOMOMORPHIC ENCRYPTION COMPUTATIONS USING SUB-NETWORKS AND MULTI-LOSS

BACKGROUND

The present techniques relate to homomorphic encryption (HE). More specifically, the techniques relate to training neural networks for use in HE computations.

Training neural network (NN) models is a task that involves heavy computations. Users who wish to train neural network often prefer to use cloud instead of maintaining their infrastructure. Nevertheless, regulations such as the European Union's General Data Protection Regulation (GDPR) may prevent them from uploading unencrypted confidential information to the cloud. One way to mitigate this issue is by using Homomorphic-Encryption (HE), which allows the cloud to perform computations on encrypted data.

HE is a technology that allows the cloud to perform computations on encrypted data without first decrypting the encrypted data. Some modern HE schemes support only basic arithmetic operations, such as addition and multiplication. For example, schemes with such limitations include the Cheon, Kim, Kim and Song (CKKS) scheme and Brakerski-Gentry-Vaikuntanathan (BGV) scheme. An algorithm that cannot be represented as a composition of these basic arithmetic operations, may therefore not be able to be computed directly in HE.

Using HE technologies gained increased attention in the last decade as they have become more and more practical. Nevertheless, HE computations are still several orders-of-magnitude slower than executing similar operations over unencrypted data. In its current state, this gap explains the focus of HE solutions on performing the fast model-inference operation rather than the slower model training.

Evaluating a function using HE involves performing ciphertext operations. These operations, and specifically multiplications, add noise to the underlying plaintext. When the noise size crosses some precalculated limit, it becomes impossible to remove the noise and extract the data. While solutions exist for handling this extra noise, they are slower than simple HE operations or even involve high bandwidth. For example, such solutions may include bootstrapping or client-aided designs. Therefore, when homomorphically evaluating a function, another optimization goal may be to reduce its multiplication depth.

Many widely used algorithms contain operations that may not currently be well-approximated as a composition of addition and multiplications with reasonable resource. For example, such operations may include division, soft-max, activation functions, normalization layers (Layer Normalization, Group Normalization), pooling layers among other types of operations. Examples of activation functions that may not be well-approximated as a composition of addition and multiplications include Gaussian Error Linear Unit (GeLU), Rectified Linear Unit (ReLU), Sigmoid, hyperbolic tangent (TANH), among others. The common components of these algorithms are referred to herein as non-polynomial components.

SUMMARY

According to an embodiment described herein, a system can include processor to receive a non-homomorphic encryption (HE)-friendly analytics model comprising a non-polynomial element. The processor can also further train a substitution model in which the non-polynomial element of the non-homomorphic encryption (HE)-friendly analytics model is replaced with a sub-network including a polynomial replacement element. Thus, the system provides a substitution model that enables HE-friendly inference to be performed. Preferably, the sub-network comprises the non-polynomial element and the polynomial replacement for the non-polynomial element. In this embodiment, the non-polynomial component can serve as a teacher for the student polynomial component during training. Optionally, a polynomial replacement element in the sub-network is initialized using the Remez algorithm. In this embodiment, the Remez algorithm provides an improved starting point for more efficient training. Preferably, a non-polynomial network comprising the non-polynomial element is pre-trained. In this embodiment, the pretrained non-polynomial network may be more efficiently trained. Preferably, the output of the sub-network during training is a weighted sum of the output of the non-polynomial element and the polynomial replacement element. In this embodiment, the weighted sum enables more efficient training. Optionally, the non-polynomial component comprises a non-parametric operation. In this embodiment, the non-parametric operation is substituted for a polynomial operation. Optionally, the non-polynomial component comprises a neural operation. In this embodiment, the neural operation is substituted with a polynomial operation. Preferably, the sub-network and network of the substitution model are trained at the same time over the same training data. In this embodiment, the joint training enables more efficient training to be performed.

According to another embodiment described herein, a method can include receiving, via a processor, a non-homomorphic encryption (HE)-friendly analytics model including a non-polynomial element. The method can further include training, via the processor, a substitution model in which the non-polynomial element of the non-homomorphic encryption (HE)-friendly analytics model is replaced with a sub-network including a polynomial replacement element. Thus, the method provides a substitution model that enables HE-friendly inference to be performed. Preferably, the method includes pretraining, via the processor, a non-polynomial network comprising the non-polynomial element. In this embodiment, the pretrained non-polynomial network may be more efficiently trained. Preferably, training the substitution model includes calculating an imitation loss between outputs of the non-polynomial element and the polynomial replacement element in the sub-network. In this embodiment, the use of an imitation loss enables the non-polynomial element to serve as a teacher for the student polynomial replacement element. Optionally, training the substitution model includes initializing the polynomial replacement element in the sub-network using the Remez algorithm. In this embodiment, the Remez algorithm provides an improved starting point for more efficient training. Preferably, training the substitution model comprises calculating a weighted sum of an output of the non-polynomial element and the polynomial replacement element in the sub-network and providing the weighted sum to an element of the substitution model adjacently coupled to the sub-network. In this embodiment, the weighted sum enables more efficient training. Preferably, training the substitution model comprises training the sub-network and the substitution model at the same time over the same training data. In this embodiment, the joint training enables more efficient training to be performed. Optionally, the method includes performing, via the processor, an inference under homomorphic encryption (HE) using the trained substitution model. In this embodiment, an HE-friendly inference is enabled. Optionally, performing the inference comprises generating a prediction under homomorphic encryption using a trained polynomial replacement element of the sub-network. In this embodiment, an HE-friendly inference is enabled.

According to another embodiment described herein, a computer program product for training neural networks can include computer-readable storage medium having program code embodied therewith. The program code executable by a processor to cause the processor to receive a non-homomorphic encryption (HE)-friendly analytics model including a non-polynomial element. The program code can also cause the processor to train a substitution model in which the non-polynomial element of the non-homomorphic encryption (HE)-friendly analytics model is replaced with a sub-network including a polynomial replacement element. Thus, the computer program product provides a substitution model that enables HE-friendly inference to be performed. Preferably, the program code can also cause the processor to pretrain a non-polynomial network comprising the non-polynomial element. In this embodiment, the pretrained non-polynomial network may be more efficiently trained. Preferably, the program code can also cause the processor to calculate an imitation loss between outputs of the non-polynomial element and the polynomial replacement element of the sub-network. In this embodiment, the use of an imitation loss enables the non-polynomial element to serve as a teacher for the student polynomial replacement element. Preferably, the program code can also cause the processor to train the substitution model and the sub-network at the same time over the same training data. In this embodiment, joint training enables more efficient training to be performed.

DETAILED DESCRIPTION

Figure 1:
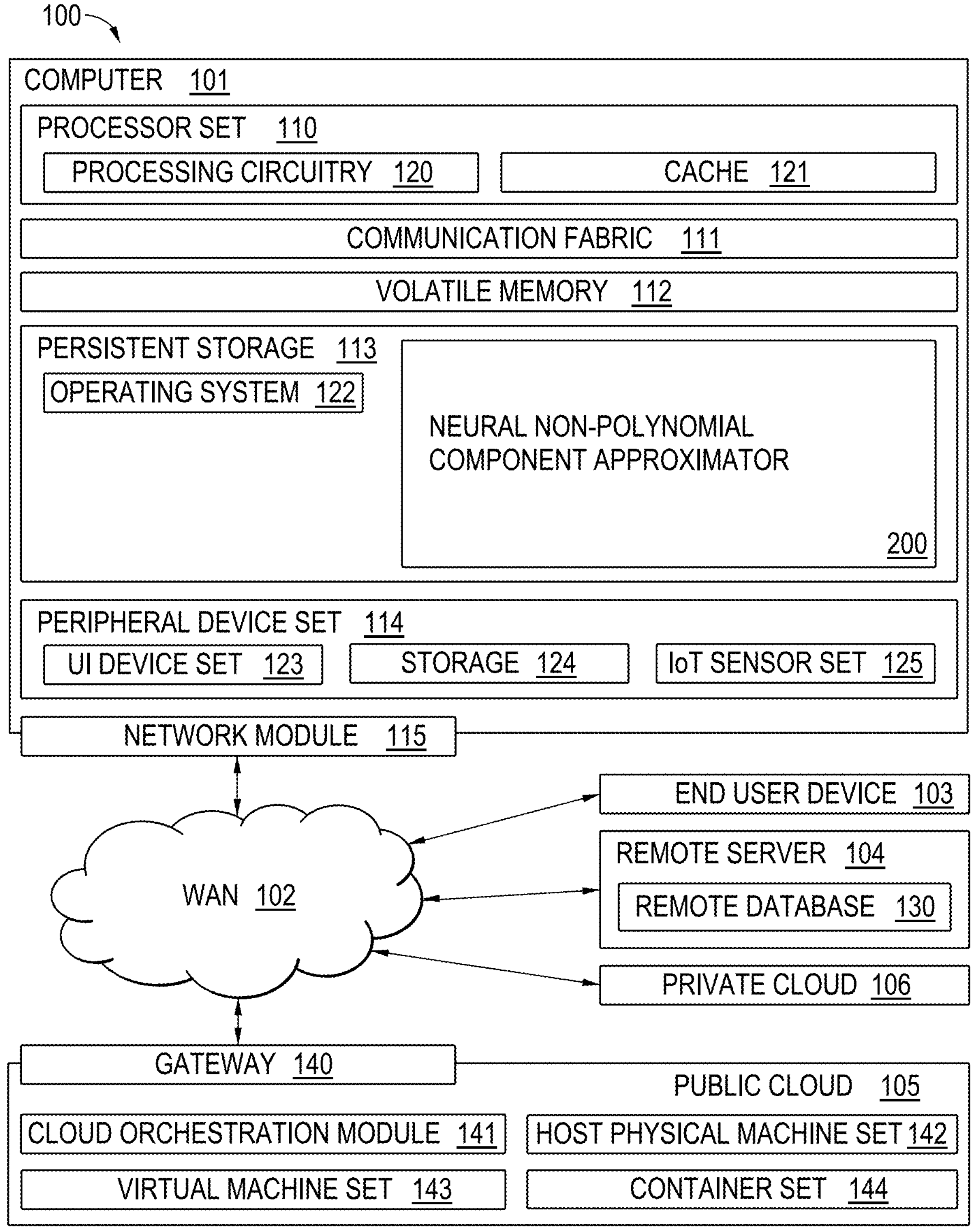
FIG. 1 is a block diagram of an example computing environment that contains an example of an environment for the execution of at least some of the computer code involved in performing the inventive methods, such as neural non-polynomial component approximation.

Several methods may be used to implement algorithms with non-polynomial components over homomorphic encryption (HE). In particular, one way to overcome the limitations of HE may be by using a client-aided design, in which the hard-to-compute operation is sent to a data-owner. The data owner then decrypts the data, computes the operation, encrypts the result, and sends the encrypted result back to the cloud to continue its HE computation. However, in addition to the communication complexity, a recent theoretical attack has raised concerns about the security of client-aided designs generally.

A second option is to replace the operation with a similar but different HE-friendly operation. For example, this solution may involve replacing a max-pooling operation with the HE-friendly operation of average-pooling, which in many use cases may not significantly affect deep neural network (DNN) performance. However, while this method is simple, this method may not work in many cases. For example, there is no trivial polynomial version of softmax. Moreover, such a solution may be more difficult with deeper networks.

A third method is finding polynomial approximations for the non-polynomial operations. For example, the ReLU activation function defined as $\text{ReLU}(x)=\max(0, x)$ may be approximated by a polynomial. In particular, the Remez algorithm and its follow-up algorithms enable finding the polynomial approximation to a function $f(x)$ given the range of x and maximal degree. Unfortunately, however, these algorithms are computationally expensive, perform poorly out of the conditional range, and in many cases have a non-negligible mean error when x is non-uniform distributed. Furthermore, where the support of x is unbounded or unknown, it is not clear how to apply these algorithms. For example, the support of x is unbounded in the popular normal distribution.

The above limitations thus make the Remez approximation in particular unsuitable for some dynamic systems. For example, when training or fine-tuning DNNs, the layer's input domain changes after each gradient step. While approximating this range at the end of each step may be easy, applying the Remez algorithm for each component and layer is practically very difficult. The same scenario is associated with HE-friendly neural inference because most of the leading methods that convert complex networks to HE-friendly models use finetuning.

According to embodiments of the present disclosure, a system includes a processor that can receive a non-homomorphic encryption (HE)-friendly analytics model including a non-polynomial element. The processor can train a substitution model in which the non-polynomial element of the non-homomorphic encryption (HE)-friendly analytics model is replaced with a sub-network including a polynomial replacement element. In various embodiments non-polynomial elements are replaced with trainable networks using multi-loss architectures in a student-teacher manner. The approximation process is integrated into the optimization process of the network by replacing non-polynomial elements with trainable sub-networks, where we specify a multi-loss referred to as the imitation loss between each pair of non-polynomial networks and its alternate polynomial approximation. These processes are optimized with stochastic gradient descent (SGD) and can be seen as multi-student-teacher learning procedures. Thus, embodiments of the present disclosure provide a dynamic approximation algorithm that uses a real-data distribution, even without expressing it explicitly, when approximating each non-polynomial component. As a result, the approximation expectation is better than when using approximations such as minimax approximations. The embodiments of the present disclosure thus enable polynomial approximation of non-polynomial components in dynamic data scenarios. In addition, the embodiments herein further consider the distribution of the input domain and exploit the distribution inherently to achieve better performance (such as accuracy, or multiplication depth) in the average case. In various examples, the embodiments may be used to reduce multiplication depth and thus reduce latency on inference. In particular, the embodiments approximate the non-polynomial function f(x) with a polynomial function p(x) on the real distribution of x, denoted by $E_{real}$ assuming that the training set represents the test set. Previous methods approximate p(x) over other distributions of x, denoted by $E_{other}$. In order to ensure reasonable accuracy, the support of $E_{real}$ must be included in the support of $E_{other}$. As a result, the approximation problem of the embodiments described herein is a sub-problem of other approximation problems, which makes the problem easier to solve. Therefore, the degree of the polynomial approximation p(x) is in many cases lower than the degree of other approximations, which reduces the overall multiplication depth and thus leads to better performance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such neural non-polynomial component approximator 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
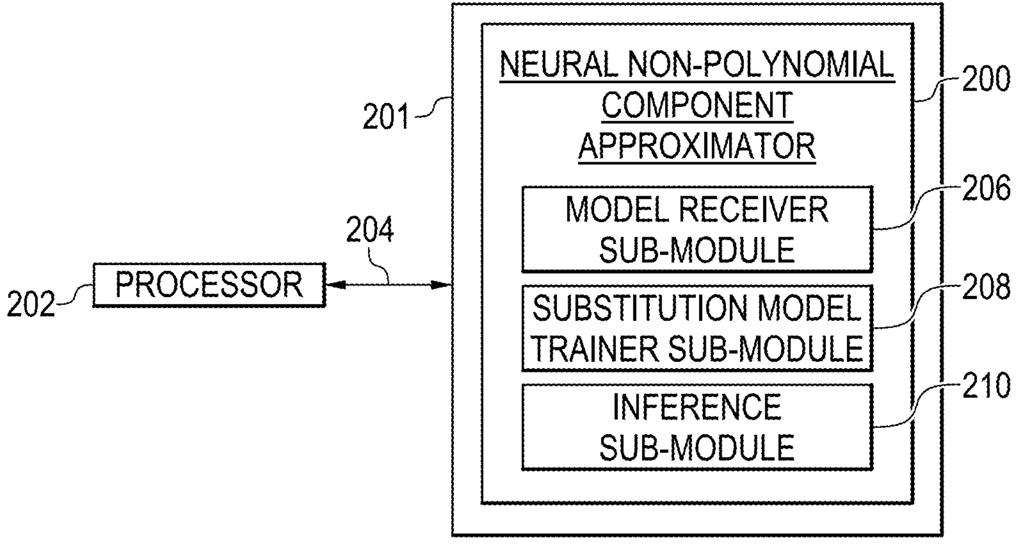
FIG. 2 is an example tangible, non-transitory computer-readable medium that can train a substitution neural network with multi-loss and sub-networks including polynomial substitution models.

Referring now to FIG. 2, a block diagram is depicted of an example tangible, non-transitory computer-readable medium 201 that can train a substitution neural network with multi-loss and sub-networks including polynomial substitution models. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the method 300A and 300B of FIGS. 3A and 3B.

The various software components discussed herein may be stored on the tangible, non-transitory, computer-readable medium 201, as indicated in FIG. 2. For example, a receiver sub-module 206 includes code to receive a non-homomorphic encryption (HE)-friendly analytics model including a non-polynomial element. A substitution model trainer sub-module 208 includes code to train a substitution model in which the non-polynomial element of the non-homomorphic encryption (HE)-friendly analytics model is replaced with a sub-network including a polynomial replacement element. The substitution model trainer sub-module 208 further includes code to pretrain a non-polynomial network including the non-polynomial element. The substitution model trainer sub-module 208 also includes code to calculate an imitation loss between outputs of the non-polynomial element and the polynomial replacement element of the sub-network. In some examples, the substitution model trainer sub-module 208 also includes code to initialize the polynomial replacement element in the sub-network using the Remez algorithm. In some examples, the substitution model trainer sub-module 208 also includes code to calculate a weighted sum of an output of the non-polynomial element and the polynomial replacement element in the sub-network and provide the weighted sum to an element of the substitution model adjacently coupled to the sub-network. In various examples, the substitution model trainer sub-module 208 also includes code to train the substitution model and the sub-network at the same time over the same training data. An inference sub-module 210 includes code to perform an inference under homomorphic encryption (HE) using a trained polynomial replacement element of the sub-network. For example, the inference may be performed using an HE-friendly analytics model that has non-polynomial elements replaced with HE-friendly trained polynomial elements.

Figure 3A:
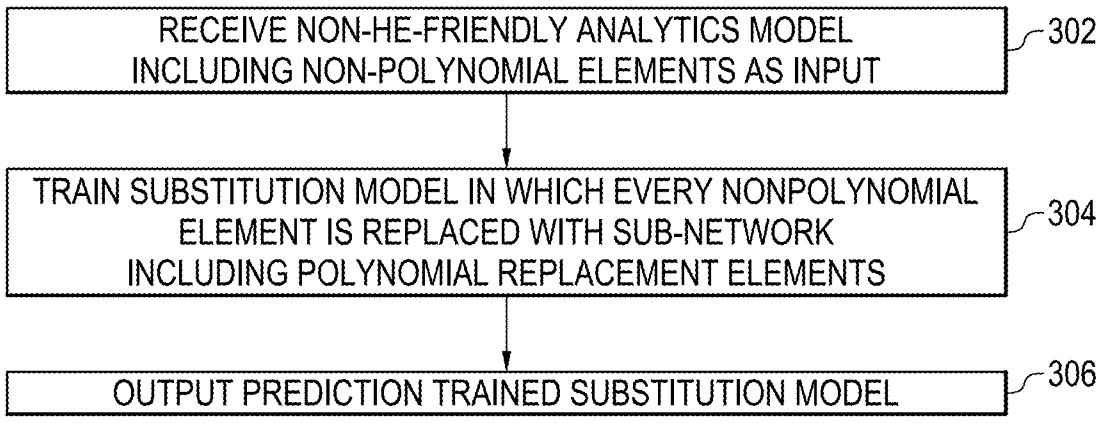
FIG. 3A is a process flow diagram of an example method that can train a neural network using sub-networks with multi-loss to replace non-polynomial components.

FIG. 3A is a process flow diagram of an example method that can train a neural network using sub-networks with multi-loss to replace non-polynomial components. The method 300A can be implemented with any suitable computing device, such as the computer 101 or end user device 103 of FIG. 1. For example, the method 300A can be implemented by the processor set 110 of FIG. 1.

At block 302, a non-HE-friendly analytics model including any number of non-polynomial elements is received as input. For example, the non-HE-friendly analytics model may be a neural network with one or more non-polynomial elements. In various examples, the non-HE-friendly analytics model may include various non-polynomial components, including neural operations, non-parametric operations, or any combination thereof. For example, the neural operations may include activation functions, such as GeLU, ReLU, Sigmoid, TANH, among other types of activation functions. The neural operations may include normalization layers, such as Layer Normalization or Group Normalization. The neural operations may include pooling layers, among other non-polynomial neural layers. The non-parametric operations may include division, softmax operations, etc.

At block 304, a substitution model is trained in which non-polynomial elements are replaced with sub-networks including polynomial replacement elements. The sub-networks may be trainable sub-neural networks including a non-polynomial element and a polynomial substitution for the non-polynomial element. In some examples, one or more non-polynomial networks including the non-polynomial elements are pretrained. In various examples, an imitation loss is calculated between outputs of the non-polynomial element and the associated polynomial replacement element of each sub-network. In some examples, the polynomial replacement element in the sub-network is initialized using the Remez algorithm. In some examples, a weighted sum of an output of the non-polynomial element and the polynomial replacement element in each sub-network may be calculated and provided to an element of the substitution model adjacently coupled to each sub-network. In various examples, the sub-networks and the substitution model are trained at the same time over the same training data.

At block 306, a trained substitution model is output. For example, the trained substitution model may be an HE-friendly substitution model that does not include any non-polynomial components.

The process flow diagram of FIG. 3A is not intended to indicate that the operations of the method 300A are to be executed in any particular order, or that all of the operations of the method 300A are to be included in every case. Additionally, the method 300A can include any suitable number of additional operations.

Figure 3B:
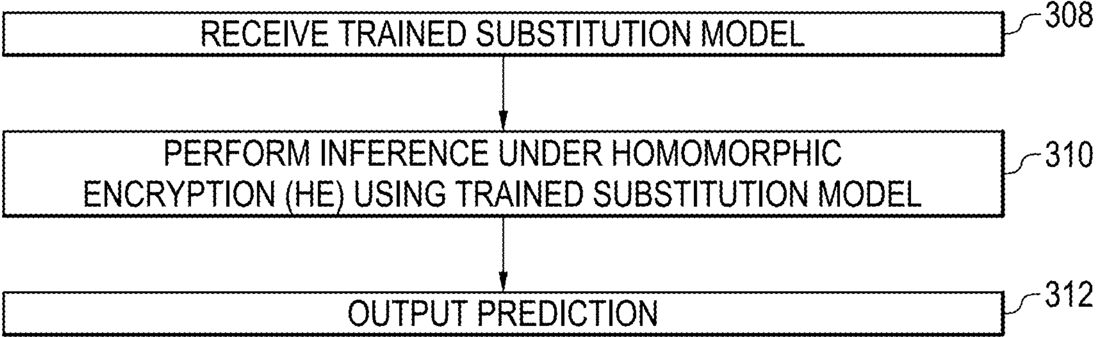
FIG. 3B is a process flow diagram of an example method that can perform inference using a neural network trained using sub-networks with multi-loss to replace non-polynomial components.

FIG. 3B is a process flow diagram of an example method that can perform inference using a neural network trained using sub-networks with multi-loss to replace non-polynomial components. The method 300B can be implemented with any suitable computing device, such as the computer 101 of FIG. 1 or end user device 103 of FIG. 1. For example, the method 300B described below can be implemented using the same or a processor set different from the processor set used in FIG. 3A.

At block 308, a trained substitution model is received. For example, the trained substitution model may have been trained using method 300A above. In various examples, the non-polynomial elements of the non-HE-friendly analytics model may be replaced with the trained polynomial replacement elements for performing inference.

At block 310, inference is performed under homomorphic encryption (HE) using the trained substitution model. For example, input test data may be processed using the trained substitution model.

At block 312, a prediction is output. For example, the prediction may be a classification of an input data. For example, the prediction may be a solution to any classification task. Examples of potential classification tasks include distinguishing between objects, such as dogs and cats, or distinguishing between pictures of lungs cancer and normal lungs. Other examples, include identifying faces. In some examples, the prediction may be for a regression task. Examples of regression tasks including estimating house prices based on city and country, or estimating chances for lungs cancer based on input factors, such as age and smoking status.

The process flow diagram of FIG. 3B is not intended to indicate that the operations of the method 300B are to be executed in any particular order, or that all of the operations of the method 300B are to be included in every case. Additionally, the method 300B can include any suitable number of additional operations.

Figure 4:
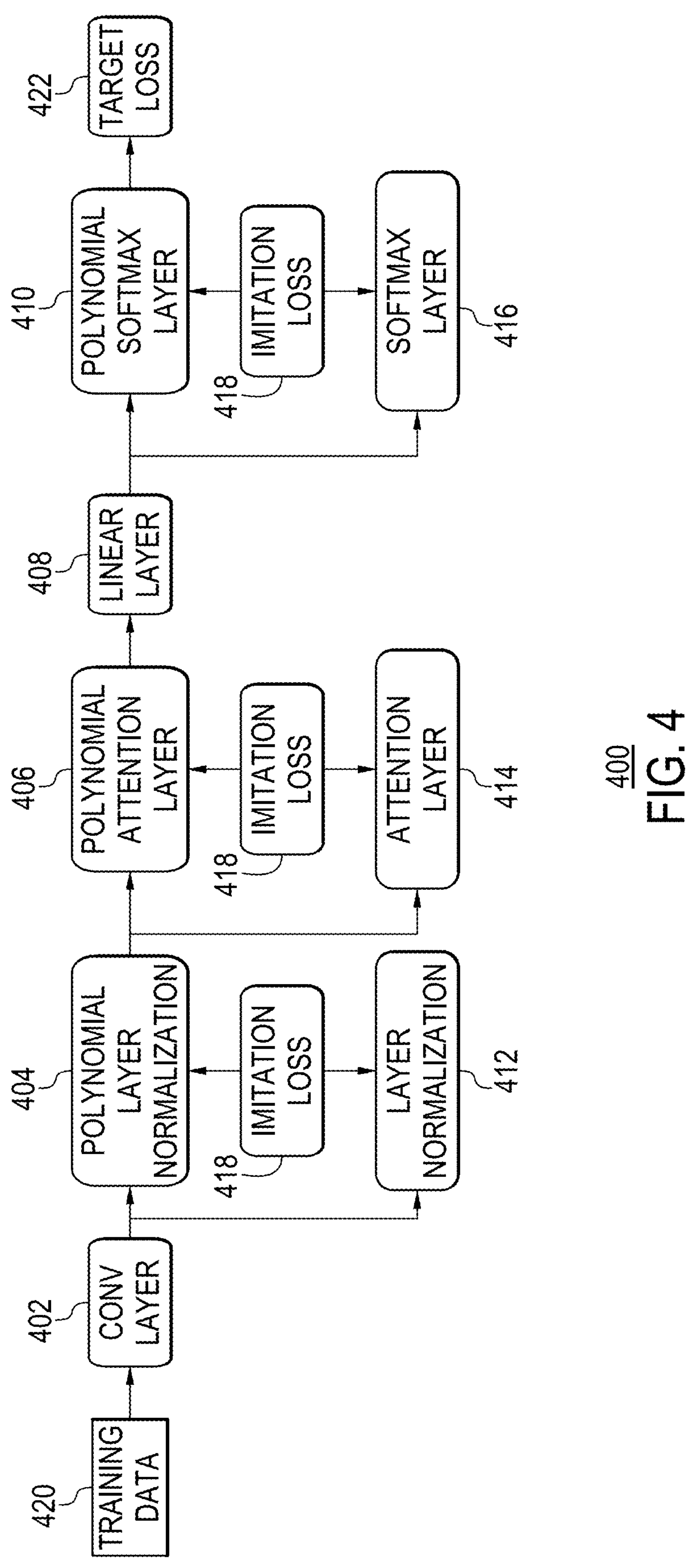
FIG. 4 is a block diagram of an example neural network trained using sub-networks with multi-loss to replace non-polynomial components.

With reference now to FIG. 4, a block diagram shows an example neural network trained using sub-networks with multi-loss to replace non-polynomial components. The example system of FIG. 4 includes a convolutional layer 402. The system 400 includes a polynomial layer normalization 404 communicatively coupled to the convolutional layer 402. For example, the polynomial layer normalization 404 is an approximation or an alternative of a standard layer-normalization layer. The system 400 includes a polynomial attention layer 406 communicatively coupled to the polynomial layer normalization 404. For example, the polynomial attention layer 406 is an approximation or an alternative of a standard attention layer. The system 400 further includes a linear layer 408 communicatively coupled to the polynomial attention layer 406. The system 400 also further includes a polynomial softmax layer 410 communicatively coupled to the linear layer 408. For example, the polynomial softmax layer 410 is an approximation or an alternative of a standard softmax layer. The system 400 also includes layer normalization 412 communicatively coupled to the convolutional layer 402. For example, the layer normalization 412 may be a standard layer-normalization layer that includes non-polynomial elements. The system also include an attention layer 414 communicatively coupled to the polynomial softmax layer 410. For example, the attention layer 414 may be a standard attention layer that includes non-polynomial elements. The system 400 also further includes a softmax layer 416 communicatively coupled to the linear layer 408. For example, the softmax layer 416 may be a standard softmax layer that includes non-polynomial elements. An imitation loss 418 is shown being calculated between the polynomial layer normalization 404 and the layer normalization 412, between the polynomial attention layer 406 and the attention layer 414, and between the polynomial softmax layer 410 and the softmax layer 416. In addition, the system 400 is shown receiving training data 420 and generating a target loss 422. For example, the target loss 422 may be a cross entropy loss, or any other suitable classification, regression, or task-specific loss.

In various examples, a neural network with non-polynomial components may be trained with substituted polynomial sub-networks to train a neural network with polynomial components. In general, given a non-polynomial component f(x) that should be replaced with appropriate HE-friendly alternative p(x), the non-polynomial component may be replaced step-by-step with a corresponding polynomial component p(x) which is parameterized by a small network p. The HE-friendly alternative network p trains on the domain of x, with an imitation loss 418 and with the same optimizer as the network. For example, the imitation loss 418 may be calculated using the equation:

$$ImitationLoss(x) := d(p(x) - f(x)) \quad \text{Eq. 1}$$

where d is some differentiable distance metric, such as any p-norm. For example, d may be an absolute value metric. In various examples, the loss terms are minimized with any suitable method, such as gradient descent or polynomial regression. In general, the process can be seen as a multi-student-teacher learning process, where each pair of student-teacher specify a custom loss term. Notably, this loss is robust to changes in the domain of x, when the domain shifts the approximation p(x) shifts accordingly. Thus, this method is easily integrated into neural network training, as shown in FIG. 4.

In the example of FIG. 4, the non-polynomial components of the original received neural network include the layer normalization 412, the attention layer 414, and the softmax layer 416. These components are to be substituted with the polynomial layer normalization 404, the polynomial attention layer 406, and the polynomial softmax layer 410, respectively.

In various examples, as shown in FIG. 4, the whole architecture trained as one system 400, including all the sub-networks 404, 406, and 410, with a custom multi-loss including a combination of imitation losses 418. In some embodiments, additional improvements may also be included to improve stability during training. For example, polynomial alternatives may be initialized with the Remez algorithm. In addition, the output of each polynomial layer can be a weighted sum of the student and teacher outputs. For example, the output sent to the polynomial attention layer 406 and the attention layer 414 from the polynomial layer normalization 404 during training may be a weighted sum of an initial polynomial layer normalization 404 output and the output of the layer normalization 412. In various examples, the teacher networks, including any of the layer normalization 412, the attention layer 414, and the softmax layer 416, may be pretrained.

In various examples, once the network of system 400 is fully trained, then the non-polynomial elements including the layer normalization 412, the attention layer 414, and the softmax layer 416 may be replaced with their trained polynomial replacement elements, including polynomial layer normalization 404, polynomial attention layer 406, and polynomial softmax layer 410, respectively, to generate an HE-friendly neural network that does not contain any non-polynomial elements.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional input data, elements, layers, or additional losses, etc.). For example, although specific examples are shown, the non-polynomial elements and corresponding polynomial replacement elements can be associated any other neural operation or non-parametric operation. In addition, in some examples, several different polynomial replacement elements using polynomials of different degrees may be trained and used depending on required multiplication depth or performance characteristics. For example, the replacement elements may have different degrees and different polynomials.

Figure 5:
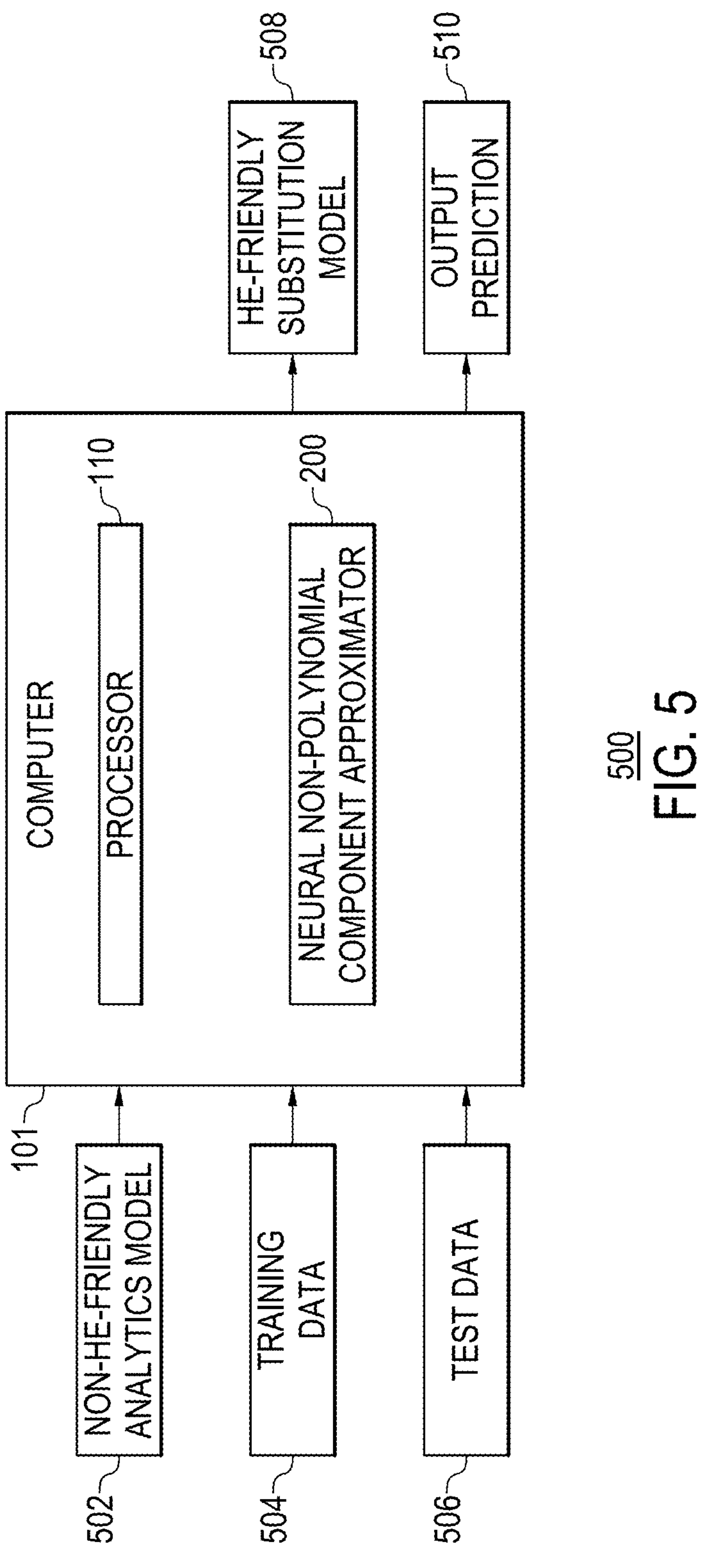
FIG. 5 is a block diagram of an example system for training a neural network using sub-networks with multi-loss to replace non-polynomial components.

FIG. 5 is a block diagram of an example system for training a neural network using sub-networks with multi-loss to replace non-polynomial components. FIG. 5 includes similarly numbered elements from FIG. 1. In addition, FIG. 5 shows a non-HE-friendly analytics model 502, training data 504, and test data 506 being shown received at computer 101. In various examples, the non-HE-friendly analytics model may be any artificial intelligence (AI) model, such as a natural language processing (NLP) model, among other neural networks with non-polynomial activations. The computer 101 is also shown generating an HE-friendly substitution model 508 and an output prediction 510. For example, the output prediction 510 may be based on the HE-friendly substitution model 508.

In the example of FIG. 5, the processor 110 receives a non-homomorphic encryption (HE)-friendly analytics model including a non-polynomial element. The processor then trains a substitution model in which the non-polynomial element of the non-homomorphic encryption (HE)-friendly analytics model is replaced with a sub-network including a polynomial replacement element. In various examples, the sub-network includes the non-polynomial element and the polynomial replacement for the non-polynomial element. In some examples, the polynomial replacement element in the sub-network is initialized using the Remez algorithm. In some examples, the non-polynomial element is pre-trained. In various examples, the output of the sub-network during training is a weighted sum of the output of the non-polynomial element and an associated polynomial replacement element. In some examples, the non-polynomial component includes a non-parametric operation. In some examples, the non-polynomial component includes a neural operation. In some examples, the trained HE-friendly substitution model 508 with non-polynomial elements replaced with trained polynomial elements can be output as shown. In various examples, the processor can perform an inference under homomorphic encryption (HE) using the trained HE-friendly substitution model 508. For example, the processor can output prediction 510 as a result of performing the inference.

It is to be understood that the block diagram of FIG. 5 is not intended to indicate that the system 500 is to include all of the components shown in FIG. 5. Rather, the system 500 can include fewer or additional components not illustrated in FIG. 5 (e.g., additional input models or data, processors, or additional outputs such as models or predictions, etc.).

Figure 6A:
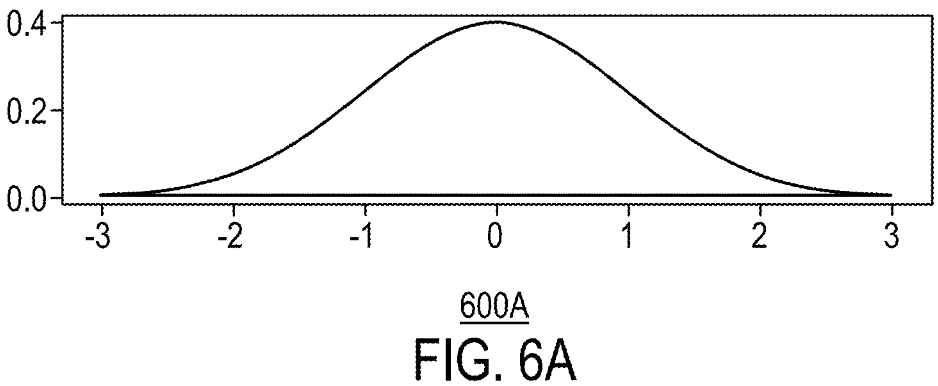
FIGS. 6A, 6B, and 6C are an example set of graphs depicting an example dynamic distribution, associated functions and approximating functions, and associated error rates with various approximating function, including an approximating function according to embodiments described herein.
Figure 6B:
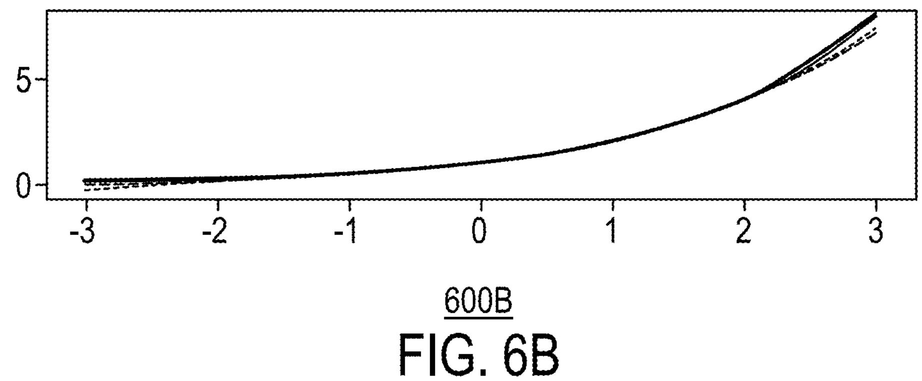
Figure 6C:
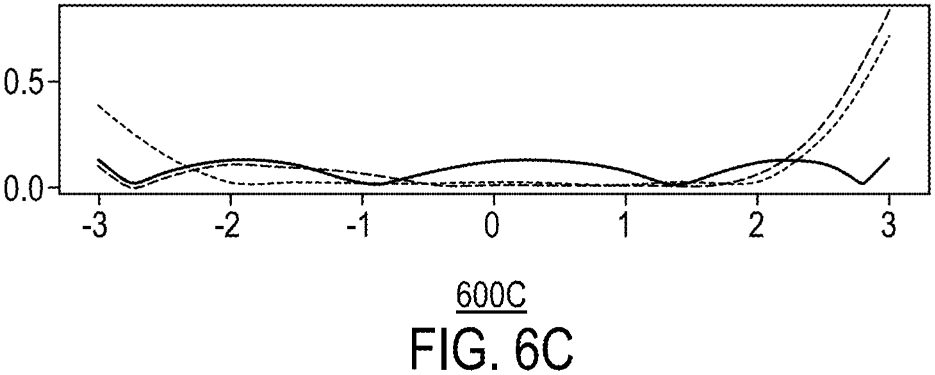

FIGS. 6A, 6B, and 6C are an example set of graphs, including graph 600A depicting an example dynamic distribution, graph 600B associated functions and approximating functions, and graph 600C depicting associated error rates with various approximating functions, including an approximating function according to embodiments described herein. As shown in graph 600A the dynamic distribution is an unbounded data distribution with x~N(0,1), such as a Gaussian distribution with a mean of zero and standard distribution of 1 u.

As shown in FIG. 6B, the graph 600B includes the target function f(x) that is to be approximated in bold solid lining, and its approximations p1(x), p2(x) using Remez in thin solid lining and shorter dashed lining, and an approximation using embodiments described herein, indicated by longer dashed lining, respectively.

Graph 600C shows the error per approximation of the various sample approximations. In particular, the graph 600C is the gap abs(p1(x)-f(x)) and abs(p2(x)-f(x)). As seen in graph 600C, for the distribution D of inputs in graph 600A, the polynomial p1(x) represented by the solid line approximates f(x) better when considering the maximal error over all inputs. However, polynomial p2(x) represented by the shorter dashed lined approximates f(x) better (lower error values) near the critical mass of the distribution. Thus, the error expectation of p2(x) over D: (E_D(abs(p2(x)-f(x))<E_D(abs(p1(x)-f(x)))) and therefore the results of the embodiments described herein, represented by the longer dashed line, are more accurate. As shown in graph 600C, the embodiments described herein result in higher error per approximation with higher values, but otherwise lower error per approximation. In particular, the embodiments described herein result in improved error per approximation at the value of zero representing the highest density of values in the distribution. Thus, the embodiments described herein may have a poor average error per approximation but a better mean error per approximation. Moreover, because the most common samples at inference will be from the center of the distribution, the performance of the trained model at inference will be improved overall.

Figure 7:
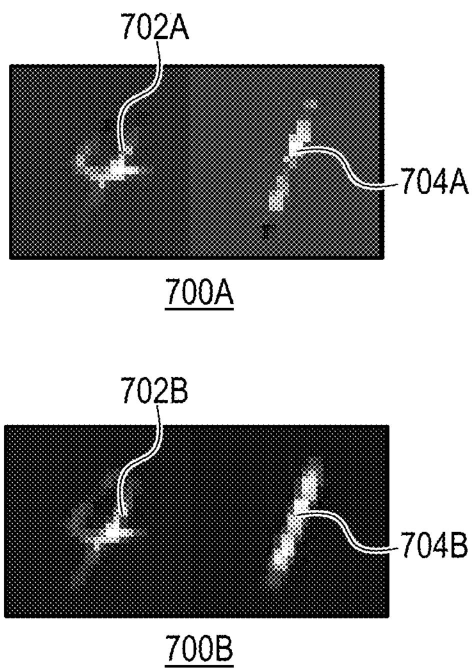
FIG. 7 is an example set of images demonstrating performance of the embodiments described herein at inference on an example dataset.

FIG. 7 is an example set of images demonstrating performance of the embodiments described herein at inference on an example dataset. The example dataset used was from the Modified National Institute of Standards and Technology (MNIST) database, which includes handwritten digits and is commonly used for training various image processing systems. The MNIST dataset includes the 10 digits 0-9, and the explainability algorithm that was used for analyzing the digits included a neural network with division and argmax operations. In particular, the explainability algorithm used for the example of FIG. 7 was the Layer-wise Relevance Propagation (LRP) algorithm. The explainability algorithm seeks to explain why an algorithm classified images to a particular digit. The first set 700A of images 702A and 704A depict the results of using the Remez algorithm approximation for explaining the detection of the digits 4 and 1, respectively. Notably, the explainability shown in images 702A and 704A includes a lot of pixels outside the actual digits. As seen in the second set 700B of images 702B and 704B depicting the explainability of the same numbers, the embodiments described herein result in improved explainability, which is shown as more concentrated in the pixels representing the digits.

Figure 8:
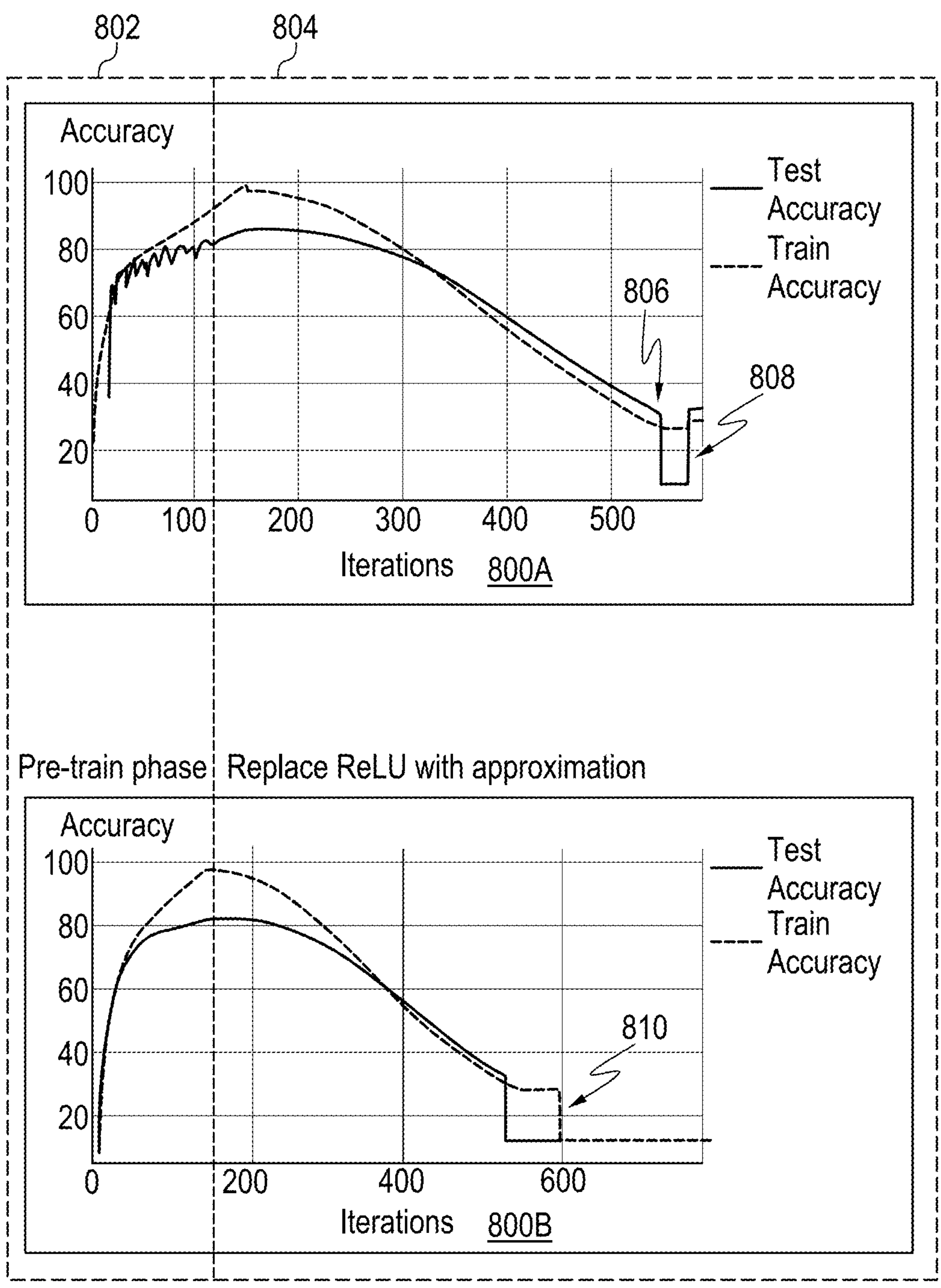
FIG. 8 is an example accuracy result of the embodiments described herein when applied to the ResNet-50 neural network.

FIG. 8 is an example accuracy result of the embodiments described herein when applied to the ResNet-50 neural network. The ResNet-50 neural network is a popular neural network that uses 50 50 non-polynomial activations functions. FIG. 8 depicts a first graph 800A showing results of the present embodiments as compared to a second graph 800B showing results of techniques without the use of the present embodiments. The x axes represent the number of epochs used in training and the y axis represents the accuracy demonstrated by the trained network. In particular, for each graph, test accuracy is depicted using solid lines and training accuracy is depicted using dashed lines.

As shown in both 800A and 800B, the network is initially trained in a pretraining phase 802 using a ReLU activation function. At phase 804, the ReLU activation is gradually increasingly replaced with polynomial based approximations for 800A and other approximations for 800B using a standard smooth transition technique.

FIG. 8 illustrates how the imitation loss according to embodiments herein makes the optimization process much more stable, enabling the generation of a polynomial ResNet50. For both graphs 800A and 800B, there is a degradation in training and test accuracy over the smooth transition process, since converting the ResNet50 network from using ReLUs to polynomials is a challenging task. As shown in arrow 806, the test set collapses. However, using the imitation loss described herein, the process is completed with a recovery indicated by arrow 808, resulting in a usable polynomial ResNet50 for encrypted data. In contrast, as shown in graph 800B, without the imitation loss described herein, the smooth transition process fails. In particular, during the smooth transition the network collapses, as indicated by arrow 810, with both the training and test accuracy dropping to random guesses. The training and test accuracy drop to 10% and there are 10 classes. Thus, the use of imitation loss according to embodiments herein forces the polynomial component to be similar to the non-polynomial network, and therefore, even where the network prediction is not stable and specifically explodes, which results in a drop in train accuracy, the imitation loss allows the network to recover, as shown at arrow 808.

By contrast, as seen in the comparison graph 800B, both test accuracy and then training accuracy drop suddenly as the number of epochs approached 600 epochs, as indicated at arrow 810. Neither the test accuracy nor training accuracy recover with additional epochs of training.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:

a processor set; and one or more computer-readable storage media;

wherein:

the processor set is structured, located, connected, and/or programmed to run program instructions stored on the one or more computer-readable storage media; and the program instructions which, when executed by the processor set, cause the processor set to perform operations comprising:

receiving a non-homomorphic encryption (HE)-friendly analytics model comprising a plurality of non-polynomial elements contained in corresponding non-polynomial models, the corresponding non-polynomial models in respectively corresponding layers of the non-HE-friendly analytics model;

establishing a sub-network for a first layer of a substitution analytics model, the sub-network including a pair of models comprising a polynomial substitution model, in which a non-polynomial element of a corresponding non-polynomial model is replaced with a polynomial replacement element, and the corresponding non-polynomial model;

training the polynomial substitution model of the sub-network by:

calculating an imitation loss between outputs of the pair of models, with the non-polynomial model operating as a teacher for the polynomial substitution model; and outputting a trained substitution analytics model including the trained polynomial substitution model of the sub-network.

2. The computer system of claim 1, wherein training the polynomial substitution model comprises:

initializing the polynomial replacement element in the sub-network using a Remez algorithm.

3. The computer system of claim 1, wherein establishing the sub-network comprises:

pretraining the non-polynomial model comprising the non-polynomial element.

4. The computer system of claim 1, wherein training the polynomial substitution model comprises:

calculating a weighted sum of an output of the non-polynomial element and the polynomial replacement element in the sub-network; and providing the weighted sum to an element of a second polynomial substitution model adjacently coupled to the sub-network within the non-HE-friendly analytics model.

5. The computer system of claim 1, wherein the non-polynomial element comprises a non-parametric operation.

6. The computer system of claim 1, wherein the non-polynomial element comprises a neural operation.

7. The computer system of claim 1, wherein training the polynomial substitution model comprises:

training the sub-network and the polynomial substitution model at a same time over a same training data.

8. A computer-implemented method, comprising:

receiving a non-homomorphic encryption (HE)-friendly analytics model comprising a plurality of non-polynomial elements contained in corresponding non-polynomial models, the corresponding non-polynomial models in respectively corresponding layers of the non-HE-friendly analytics model;

establishing a sub-network for a first layer of a substitution analytics model, the sub-network including a pair of models comprising a polynomial substitution model, in which a non-polynomial element of a corresponding non-polynomial model is replaced with a polynomial replacement element, and the corresponding non-polynomial model;

training the polynomial substitution model of the sub-network by:

calculating an imitation loss between outputs of the pair of models, with the non-polynomial model operating as a teacher for the polynomial substitution model; and outputting a trained substitution analytics model including the trained polynomial substitution model of the sub-network.

9. The computer-implemented method of claim 8, wherein establishing the sub-network comprises:

pretraining the non-polynomial model comprising the non-polynomial element.

10. The computer-implemented method of claim 8, wherein training the polynomial substitution model comprises:

initializing the polynomial replacement element in the sub-network using a Remez algorithm.

11. The computer-implemented method of claim 8, wherein training the polynomial substitution model comprises:

calculating a weighted sum of an output of the non-polynomial element and the polynomial replacement element in the sub-network; and providing the weighted sum to an element of a second polynomial substitution model adjacently coupled to the sub-network within the non-HE-friendly analytics model.

12. The computer-implemented method of claim 8, wherein training the polynomial substitution model comprises:

training the sub-network and the polynomial substitution model at a same time over a same training data.

13. The computer-implemented method of claim 8, further comprising:

performing an inference under HE using the trained substitution analytics model.

14. The computer-implemented method of claim 13, wherein performing the inference comprises:

generating a prediction under HE using the trained polynomial substitution model of the sub-network.

15. The computer-implemented method of claim 8, wherein outputting the trained substitution analytics model includes:

integrating polynomial replacement optimization by specifying imitation losses between outputs of each pair of polynomial/non-polynomial models of the substitution analytics model including the pair of models comprising the polynomial substitution model and the corresponding non-polynomial model.

16. The computer-implemented method of claim 8, wherein:

the non-HE-friendly analytics model is a neural network including the first layer; and the first layer is a member of the group consisting of: a) a normalization layer, b) an attention layer, and c) a softmax layer.

17. A computer program product comprising one or more computer-readable storage media having a set of instructions stored therein which, when executed by a processor, causes the processor to perform a method comprising:

receiving a non-homomorphic encryption (HE)-friendly analytics model comprising a plurality of non-polynomial elements contained in corresponding non-polynomial models, the corresponding non-polynomial models in respectively corresponding layers of the non-HE-friendly analytics model;

establishing a sub-network for a first layer of a substitution analytics model, the sub-network including a pair of models comprising a polynomial substitution model, in which a non-polynomial element of a corresponding non-polynomial model is replaced with a polynomial replacement element, and the corresponding non-polynomial model;

training the polynomial substitution model of the sub-network by:

calculating an imitation loss between outputs of the pair of models, with the non-polynomial model operating as a teacher for the polynomial substitution model; and outputting a trained substitution analytics model including the trained polynomial substitution model of the sub-network.

18. The computer program product of claim 17, wherein establishing the sub-network comprises:

pretraining the non-polynomial model comprising the non-polynomial element.

19. The computer program product of claim 17, wherein training the polynomial substitution model comprises:

training the polynomial substitution model and the sub-network at a same time over a same training data.

* * * * *